(12) United States Patent
Stoller et al.

(10) Patent No.: US 9,681,192 B2
(45) Date of Patent: Jun. 13, 2017

(54) CONTENT MANAGEMENT IN A NETWORK ENVIRONMENT

(71) Applicant: Time Warner Cable Enterprises LLC, New York, NY (US)

(72) Inventors: Daniel Stoller, Bedford, NY (US); Albert Straub, Westminster, CO (US); Peter Stern, Greenwich, CT (US)

(73) Assignee: Time Warner Cable Enterprises LLC, New York, NY (US)

( * ) Notice: Subject to any disclaimer, the term of this patent is extended or adjusted under 35 U.S.C. 154(b) by 543 days.

(21) Appl. No.: 14/078,798

(22) Filed: Nov. 13, 2013

(65) Prior Publication Data

US 2015/0135241 A1 May 14, 2015

(51) Int. Cl.
| | |
|---|---|
| H04H 60/32 | (2008.01) |
| H04N 7/173 | (2011.01) |
| H04N 21/475 | (2011.01) |
| H04N 21/258 | (2011.01) |
| H04N 21/45 | (2011.01) |
| H04N 21/262 | (2011.01) |
| H04N 21/60 | (2011.01) |
| H04N 21/231 | (2011.01) |
| H04N 21/274 | (2011.01) |
| H04N 21/81 | (2011.01) |

(52) U.S. Cl.
CPC ... *H04N 21/4755* (2013.01); *H04N 21/23116* (2013.01); *H04N 21/25891* (2013.01); *H04N 21/26275* (2013.01); *H04N 21/274* (2013.01); *H04N 21/4532* (2013.01); *H04N 21/60* (2013.01); *H04N 21/8133* (2013.01)

(58) Field of Classification Search
CPC ....... H04N 21/23116; H04N 21/26275; H04N 21/60
USPC ...................................... 725/14, 98
See application file for complete search history.

(56) References Cited

U.S. PATENT DOCUMENTS

| | | | | |
|---|---|---|---|---|
| 6,505,348 | B1 * | 1/2003 | Knowles | H04N 5/44543 348/E5.103 |
| 6,681,396 | B1 * | 1/2004 | Bates | H04N 5/782 386/E5.043 |
| 7,840,563 | B2 * | 11/2010 | Powers | G06F 17/30817 707/736 |
| 2006/0171453 | A1 * | 8/2006 | Rohlfing | G08B 13/19632 375/240.01 |
| 2009/0187575 | A1 * | 7/2009 | DaCosta | G06Q 30/06 |
| 2010/0272413 | A1 * | 10/2010 | Bhogal | H04N 5/765 386/248 |
| 2011/0119626 | A1 * | 5/2011 | Faenger | G06F 3/0482 715/811 |

(Continued)

*Primary Examiner* — Pankaj Kumar
*Assistant Examiner* — Franklin Andramuno
(74) *Attorney, Agent, or Firm* — Chapin Intellectual Property Law, LLC

(57) ABSTRACT

An analyzer resource monitors content access information indicating availability of different types of content available to multiple subscribers over a shared communication link. To facilitate selection of content by respective subscribers, the analyzer resource sorts the available content into different classes (genres) based on a respective subject matter of the corresponding available content. The analyzer resource produces a listing of the different classes (genres) of available content. Subscribers select and/or customize genre-based feeds to store content in a repository for later retrieval.

22 Claims, 9 Drawing Sheets

(56) References Cited

U.S. PATENT DOCUMENTS

| | | | | |
|---|---|---|---|---|
| 2011/0201373 A1* | 8/2011 | Suzuki | H04W 4/08 | 455/517 |
| 2012/0254926 A1* | 10/2012 | Takahashi | H04N 21/4331 | 725/98 |
| 2014/0125593 A1* | 5/2014 | Li | G06F 3/04883 | 345/158 |
| 2014/0130097 A1* | 5/2014 | Londero | H04N 5/44543 | 725/48 |
| 2014/0150005 A1* | 5/2014 | Kalmes | H04N 21/25866 | 725/14 |
| 2015/0128040 A1* | 5/2015 | Nielsen | G11B 27/102 | 715/716 |
| 2015/0312613 A1* | 10/2015 | Hunt | H04L 65/60 | 725/34 |

\* cited by examiner

| MAP INFORMATION 375 | |
|---|---|
| CONTENT | NETWORK ADDRESS |
| A1 | ADDRESS 310-1 |
| A2 | ADDRESS 310-2 |
| A3 | ADDRESS 310-3 |
| A4 | ADDRESS 310-4 |
| ... | ... |
| B1 | ADDRESS 320-1 |
| B2 | ADDRESS 320-2 |
| B3 | ADDRESS 320-3 |
| B4 | ADDRESS 320-4 |
| ... | ... |

FIG. 3

CONTENT MANAGEMENT IN A NETWORK ENVIRONMENT

BACKGROUND

In general, conventional techniques of notifying subscribers in a cable network environment of the availability of content include producing a content guide and initiating distribution of the content guide to subscribers. As an example, a content guide can include a grid-based listing of available channels and corresponding television programs broadcasted in different time slots. Via selection of a particular channel, a subscriber is able to tune to a broadcast channel and view playback of content on a respective display screen such as a television. In certain instances, a subscriber can select a program from the content guide for recording in a digital video recorder.

It is not uncommon that channels broadcasting similar types of content are separated from one another in a content guide listing. For example, channel 550 and channel 555 in a content guide listing can be sports channels that broadcast different sports events. An in-between channel such as channel 552 can be allocated for broadcasting shows about history.

Channels (such as channel 550 and channel 555) including the similar type of content (i.e., sports content) are sometimes purposefully spaced apart from each other in the content guide. For example, this typically forces the subscriber to at least view titles of content available on other channels (such as in-between channels 551, 552, 553, etc.). In certain instances, if a user selects channel 552, the subscriber may receive notification that they currently do not subscribe to that channel. The subscriber is then given the opportunity to pay an additional fee to subscribe to and view corresponding content on channel 552.

Thus, spacing of similar content apart from each other on different channels is a way of potentially up-selling cable network services and increasing revenues. In other words, a user may subscribe to channel 552.

As an alternative to standard broadcast of content, certain video content is typically available as IPTV (Internet Protocol TeleVision). IP video distribution is typically available via multiple conventional mechanisms. For example, applications such as Miro™ and iTunes™ distribute their content via the use of a protocol known as Really Simple Syndication (RSS). Other entities, such as the National Weather Service, utilize the Internet Atom specification (RFC4287) to distribute content. In general, all of these "pull" mechanisms require that the end user subscribe to a respective feed and download the content to local storage for subsequent playback on their devices.

BRIEF DESCRIPTION OF EMBODIMENTS

Conventional techniques of providing notification of available content and managing distribution of available content suffer from deficiencies. For example, as mentioned, similar types of content in which a respective user is interested can be randomly located in a content guide. This makes it difficult for the respective user to find content of interest for recording in a respective digital video recorder.

Compounding the problem of random channels of content, an amount of available video on broadcast and online distribution networks has steadily increased over time. Today, it is not uncommon that a content guide listing includes hundreds of channels available to a respective subscriber. Accordingly, there is typically so much different content in a respective content guide that subscribers occasionally are overwhelmed when attempting to make a decision which channel to select for recording. Often times, a subscriber is not aware of content that is likely of interest.

Embodiments herein deviate with respect to conventional techniques and provide a unique way of enabling subscribers to select content of interest for storage and selective playback.

For example, in accordance with more specific embodiments, a network environment such as a cable network environment can be configured to include an analyzer resource. The analyzer resource monitors content access information indicating availability of different types of content available to multiple subscribers over a shared communication link.

To facilitate selection of content by respective subscribers, the analyzer resource sorts the available content into different classes (genres) such as based on a respective subject matter of the corresponding available content. In one embodiment, based on monitoring the availability of content in the network, the analyzer resource identifies different titles of content (such as different television shows, each of which has one or more episodes) available to multiple subscriber domains over the shared communication link. The analyzer resource sorts the different (titles or series of) content into different classes. The analyzer resource produces a listing of the different classes (genres) of available content.

In one embodiment, each generated class (or genre) is configured to indicate availability of content falling within a corresponding class (genre) to which the respective content feed pertains. For example, a first content feed (such as a genre of content including children's video content) can indicate availability of different types of content targeted to children; a second content feed (such as a genre of content including sports events) can indicate availability of content targeted to sports fans; etc. Thus, embodiments herein include genre-based content feeds for retrieval of content across multiple cable network channels.

In accordance with a further embodiment, each genre represents a content feed for possible selection by a subscriber. Subscribers select from the multiple available content feeds sorted according to genre to store content for later viewing. If a user desires to record sports video content, the user can select a respective genre including sports events; if a user desires to record political news video content, the user can select a respective genre including political news; and so on.

In certain instances, if desired, a respective subscriber can produce a customized content feed for recording content of interest within a corresponding genre. For example, embodiments herein can include displaying attributes (such as different channels or sub-genres) of a content feed for a corresponding genre. The attributes can include symbols associated which available content that falls within a respective genre. Via input, the subscriber can select to record or not record different types of content within the respective selected genre. Accordingly, customization enables a subscriber to filter out certain content within a respective genre of interest.

Embodiments herein include storing the subscribers' settings information. The settings information (derived from a respective subscriber or other suitable resource) indicates genre-based selection of content to be stored in a repository.

Based on further input such as a command from a subscriber or other suitable resource to store content on behalf of the subscriber as specified by the subscriber settings, a monitor resource receives subscriber settings information. As mentioned, the subscriber settings can be genre-based and indicate content of interest to be recorded on behalf of the subscriber. The monitor resource uses the subscriber settings information as a basis to identify content to be stored on behalf of the subscriber.

In accordance with further embodiments, the settings information can include one or more channels. By way of a non-limiting example, the one or more channels in a selected genre can be Atom channels. In such an instance, each of the channels to be monitored by the monitor resource can have an associated network address such as a URL (Uniform Resource Locator). To identify content to record on behalf of the subscriber, the monitor resource communicates with a server resource at the appropriate network address and determines content to be recorded. If needed, the monitor resource can use content guide information to determine a time slot and on what cable network channel the corresponding content (to be recorded) is available. In certain instances, the content can be available as over-the-top content as opposed to being broadcast content. In one embodiment, over-the-top content is available over a portion of bandwidth in a shared cable network communication link. By way of a non-limiting example, the portion of bandwidth can be allocated to support data channels in accordance with DOCSIS (Data Over Cable Service Interface Specification) or any other suitable communication standard.

In accordance with settings information, the monitor resource initiates storage of appropriate content in storage hardware.

Subsequent to storage, the respective subscriber is able to access the stored content from the storage hardware. For example, in accordance with input commands from a subscriber, a distribution resource initiates distribution of the content over a shared communication link in a cable network environment from the storage hardware to a communication device operated by the subscriber.

Note that yet further more specific embodiments enable an end user such as a subscriber to lease a digital video recorder, RSS and Atom feed accumulator, and storage resource. The control of such a system is provided via a user interface that sorts all content via genre so that viewers can subscribe to content feeds selected via genre rather than by the conventional mechanism of scheduling individual recordings of different titles of content.

Techniques as discussed herein are useful over conventional techniques. For example, certain embodiments allow users to select genre-based storage of content (such as video). In one embodiment, the system automatically and timely pulls notifications of new content to be recorded on behalf of if a subscriber independent of the content source. These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor (such as computer processor hardware), program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device or distributed computer processor hardware to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware, cause the computer processor hardware of the system to: receive a selection of a genre of content; monitor a network for availability of content classified within the selected genre; initiate storage of the content in storage hardware; and initiate distribution of the content from the storage hardware to a communication device operated by a subscriber.

Yet another embodiment herein includes a computer readable storage medium and/or system having instructions stored thereon. The instructions, when executed by computer processor hardware, cause the computer processor hardware to: monitor an availability of content to multiple subscribers, the content available over a shared communication link in a network; sort the available content into different classes based on a respective subject matter of the content; and produce a respective accessible content feed for each of the different classes of available content, each respective content feed indicating availability of content falling within a corresponding class to which the respective content feed pertains.

Yet a further embodiment herein includes a computer readable storage medium and/or system having instructions stored thereon. The instructions, when executed by computer processor hardware, cause the computer processor hardware to: identify first content that is consumed by a subscriber in a subscriber domain; identify a particular genre in which the first content is classified; identify second content that falls within the particular genre and is also available to the subscriber; and initiate storage of the second content in storage hardware accessible to the subscriber in response to detecting consumption of the first content by the subscriber.

Note that the ordering of the operations as discussed herein can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for managing storage of content in a network environment on behalf of one or more subscribers. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating mapping of different types of respective content to a corresponding server network address from which to retrieve content according to embodiments herein.

Figure 1:
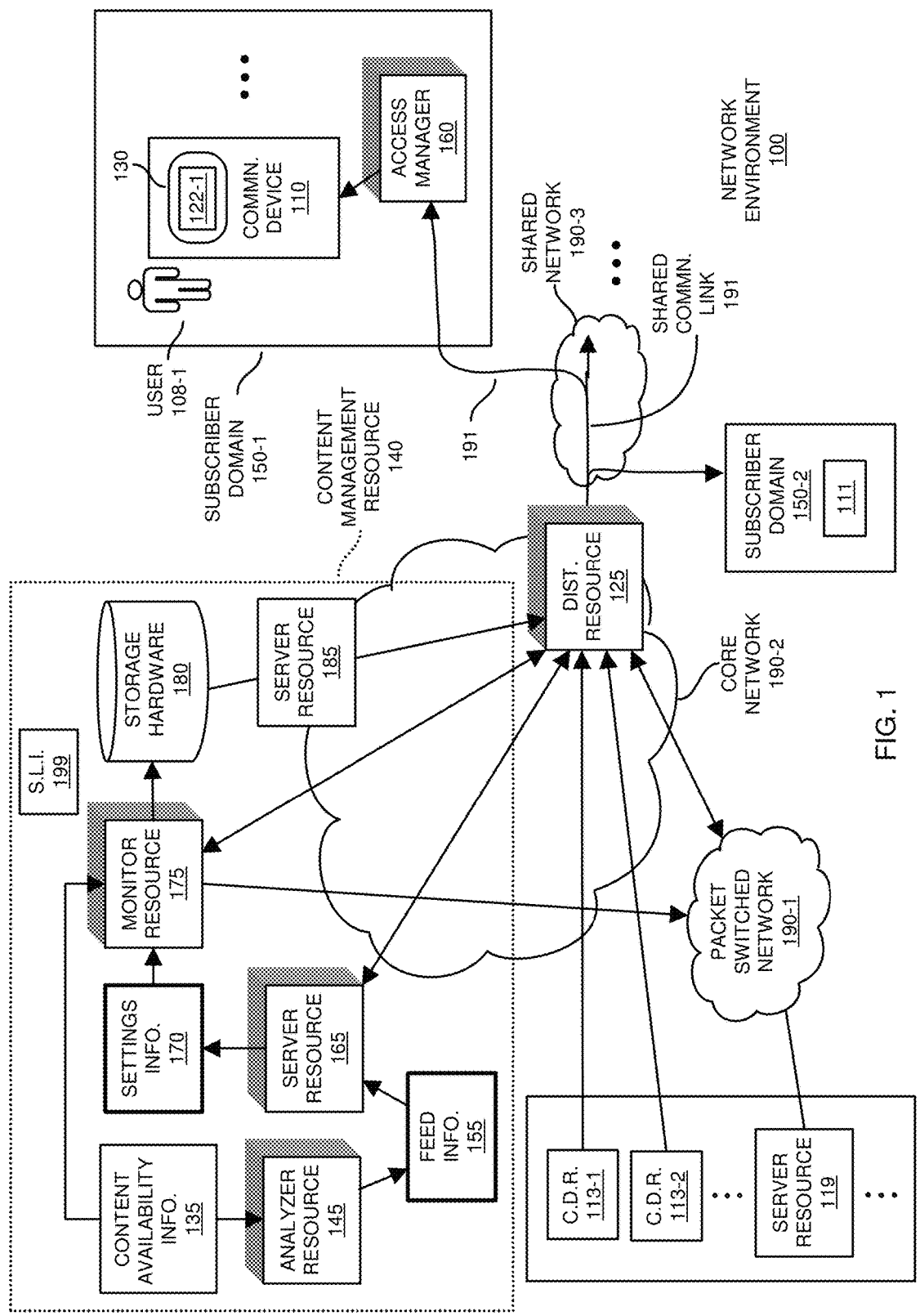
FIG. 1 is an example diagram illustrating a network environment supporting content management according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment according to embodiments herein.

In general, embodiments herein enable user 108-1 in subscriber domain 150-1 to select which available content in network environment 100 is to be stored in storage hardware 180 for subsequent retrieval.

For example, in one embodiment, an analyzer resource monitors content access information indicating availability of different types of content available to multiple subscribers over a shared communication link. To facilitate selection of content by respective subscribers, the analyzer resource sorts the available content into different classes (genres) based on a respective subject matter of the corresponding available content. The analyzer resource produces a listing of the different classes (genres) of available content in content feeds. In one embodiment, subscribers can select and/or customize genre-based content feeds to indicate types of content to store in a respective repository for later retrieval.

General Operation of Network Environment

Network environment 100 includes multiple networks 190. In this example embodiment, as shown, network environment 100 can include a packet-switched network 190-1 (supporting distribution of over-the-top content), a core network 190-2 (supporting distribution of video on demand content and linear content), shared network 190-3, and so on.

In general, via the different types of networks 190, respective subscribers and corresponding playback devices (such as communication device 110, communication device 111, etc.) in respective subscriber domains 150 are able to retrieve and playback different types of content such as over-the-top content, scheduled broadcast content, video on-demand content, etc.

In addition to playing back content, the playback devices (such as communication device 110, 111, . . . ) can be used to configure content management resource 140. As its name suggests, content management resource 140 stores selected content on behalf of respective subscribers.

In one example embodiment, as discussed in more detail herein, communication device 110 includes display screen 130 to select content to be recorded in storage hardware 180. Display screen 130 also enables the user 108-1 to play back content stored in storage hardware 180.

In addition to one or more playback devices (such as communication devices 110, 111, etc.), each subscriber domain can also include an access manager 160 that manages access to shared communication link 191 in network 190-3. In this example embodiment, subscriber domain 150-1 includes access manager 160 to control access to packet-switched network 190-1 and core network 190-2. If desired, functions provided by access manager 160 can be provided by communication device 110.

Access manager 160 can be any suitable type of resource such as a set-top box, cable modem, WiFi™ network or base station, access point, server resources, data router, etc.

Communication links between the access manager 160 and respective communication device 110 can be any suitable type of communication medium such as a physical medium, a wireless medium, etc. The access manager 160 can be an access point controlling network access for each of multiple members in subscriber domain 150-1.

In one embodiment, access manager 160 facilitates distribution of content received over shared communication link 191 to the device 110. For example, via communications through the access manager 160 and over shared communication link 191 to distribution resource 125 (such as a cable modem termination system), the communication device 110 in subscriber domain 150-1 can initiate retrieval of content such as video on demand content, IPTV content, over-the-top content, etc.

As mentioned above, in one embodiment, the shared communication link 191 can be configured to support distribution of so-called over-the-top content. For example, a portion of bandwidth in shared communication link 191 can be allocated to support data channels in accordance with DOCSIS (Data Over Cable Service Interface Specification) or any other suitable communication standard. Each subscriber domain can be assigned use of a portion of bandwidth in the data channels to communicate data upstream or downstream in network environment 100.

Via the data channels, each of the subscribers in respective subscriber domains 150 can retrieve over-the-top content from respective server sources disposed in packet-switched network 190-1 such as the Internet. As its name suggests, packet-switched network 190-1 enables routing of data packets based on network address information.

Packet-switched network 190-1 can support client-server type communications. For example, communication device 110 operated by a respective user 108-1 can generate a request for retrieval of content from a particular server resource such as server resource 119 using an appropriate network address of the server resource 119. Via client server type communications, the communication device 110 is able to retrieve and transmit content to different resources in network environment 100.

In response to receiving a request for content, the server resource 119 transmits the requested content over packet-switched network 190-1 (as over-the-top content) and shared communication link 191 to the access manager 160. The access manager 160 forwards the received content to communication device 110-1 in subscriber domain 150-1 using the network address of the communication device 110-1. In this manner, each of the communication devices in subscriber domain 150 can retrieve content via communication through the access manager 160.

In one embodiment, core network 190-2 is or includes a cable network supporting services such as distribution of content via one or more cable television broadcast channels (e.g., QAM or quadrature amplitude modulated channels, IPTV channels, etc.) to subscriber domains in network environment 100. Multiple channels in shared communication link 191 can be configured to support broadcast of linear content such as content transmitted in corresponding scheduled timeslots.

Access manager 160 can receive broadcast content from any suitable resource such as content delivery resource 113-1, content delivery resource 113-2, etc. Broadcast content is transmitted over predetermined channels in shared communication link 191 to multiple subscriber domains 150. To play back broadcast content, the access manager 160 tunes to one or more channels as indicated by users of respective communication devices.

As shown, shared network 190-3 (including shared communication link 191) supports final connectivity to subscribers or subscriber domains 150 and may include physical media such as one or more coaxial cables, optical fibers, twisted wire pairs, etc., to provide connectivity between distribution resource 125 and the subscriber domains 150. Similar physical media or wireless media can be used to connect resources in network 190-2.

In one embodiment, each subscriber domain connected to the shared communication link 191 in shared network 190-3 is part of a respective service group that receives a same set of downstream signals transmitted by distribution resource 125. Any of the devices in the service group can tune to the streaming content broadcasted over shared communication link 191. In a manner as discussed above, other content such as over-the-top content transmitted over the shared communication link 191 may be specifically addressed to the access manager 140 residing in a respective subscriber domain. As mentioned, the access manager 140 forwards received content to appropriate one or more communication devices in a respective subscriber domain.

Selection of Content for Recording on Behalf of Subscribers

Subscribers in respective subscriber domains 150 can execute a browser, media player application, etc., on a respective communication device. Assume in this example embodiment that the user 108-1 transmits a request to server resource 165 to control which content available to the user 108-1 is to be recorded in storage hardware 180. In general, based on feed information 155, server resource 165 enables the subscriber 108-1 to select which content to record in storage hardware 180.

Note that content management resource 140 includes analyzer resource 145. In one embodiment, the analyzer resource 145 produces feed information 155. To create feed information 155, the analyzer resource 145 monitors content availability information 135 to identify availability of different types of content available to subscribers over shared communication link 191.

Content availability information 135 can include any suitable information such as content guide information indicating different content available over shared communication link 191. In one embodiment, the content guide information indicates when corresponding content is broadcasted over shared communication link 191.

Content availability information 135 can also indicate network addresses of servers in corresponding available over-the-top content. Thus, as mentioned, the available content as specified by the content availability information 135 can include broadcast content, video on demand content, over-the-top content, etc.

To facilitate selection of content for recording in storage hardware 180, the analyzer resource 145 sorts the available content as indicated by content availability information 135 into different classes (genres) based on a respective subject matter of the corresponding available content. For example, available content targeted for viewing by children is sorted into a first genre such as a Kid's genre; available content targeted for viewing by sports fans is sorted into a second genre such as a Sports genre; and so on.

In certain instances, a genre may be very broad. To enable better management of content, each genre can be subdivided into one or more sub-genres. Subsequent to creating a sub-genre within a selected genre, the sub-genre can be used to classify future available content of a particular sub-topic within the sub-genre. As an example, a parent genre may be the general class of sports type content. A first sub-genre within the sports parent genre may be sport events; a second sub-genre in the sports genre may be sports talk shows; and so on. The sub-genres enable better targeting of content of interest for selection by a respective user.

If desired, note that each genre or sub-genre can be broken down into yet further sub-genres. For example, the genre including content for viewing by sports fans can include subgenres including a subgenre for football content, a subgenre for hockey content, a subgenre for baseball content, etc.

For the different content sorted according to genre, the analyzer resource 145 produces feed information 155. As its name suggests, among other things, feed information 155 can indicate corresponding sources to query to learn of different types of newly available content for a respective genre, sub-genre, etc.

Figure 2:
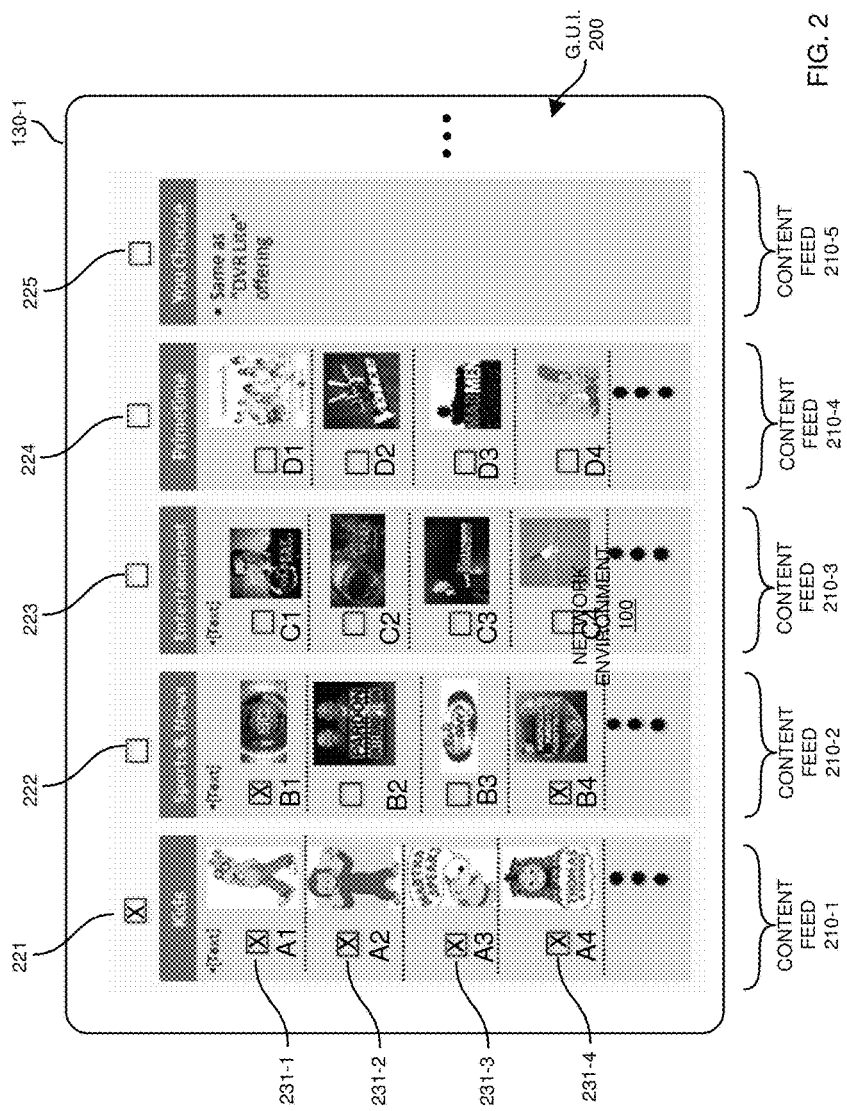
FIG. 2 is an example diagram illustrating availability of content sorted according to genre according to embodiments herein.

To learn of available content feeds for possible storage of corresponding content of interest in storage hardware 180, the user 108 operates communication device 110 to retrieve a viewable rendition of feed information 155 (content classified according to genre) from server resource 165. In this example, in response to receiving a request for viewing of feed information 155, the server resource 165 initiates display of graphical user interface 200 (a rendition of feed information 155) as shown in FIG. 2.

In this example embodiment, graphical user interface 200 includes content feeds 210 (e.g., content feed 210-1, content feed 210-2, content feed 210-3, content feed 210-4, content feed, 210-5, etc.).

The server resource 165 utilizes the feed information 155 to produce a listing of the different genres of available content. As mentioned, the different genre-based content feeds 210 are selectable by the user 108. In this example embodiment, each of the genre-based content feeds 210 indicates availability of different channels of content falling within a corresponding type.

For example, a first content feed 210-1 (such as a Kid's genre of content including children's video) can indicate availability of content A1 such as a first television series, content A2 such as a second television series, content A3 such as a third television series, content A4 such as a fourth television series, etc.

Note that the different content A1, A2, A3, etc., in a respective genre can represent a single television show, movie, etc.; different content A1, A2, A3, etc., can represent a series of shows from a particular content provider; different content A1, A2, A3, etc., can represent an available channel (e.g., the Disney™ channel, the Red Zone™, etc.) of shows from a particular content provider.

Each of the different sub-classes of content (such as content A1, content A2, etc.) in a genre can represent a different feed option for selection by a subscriber.

For example, content option A1 can represent a first content feed selection option within the Kid's genre to store a first type of content falling within the genre; content option A2 can represent a second content feed selection option within the genre to store a second type of content falling within the genre; and so on. Accordingly, embodiments herein can include displaying multiple selectable feed options within a selected genre. Each of the multiple selectable feed options specifies a particular type of content (e.g., a name of a television show represented by the feed option) within the selected genre.

As mentioned, the user 108-1 can select the appropriate content feed options within the genre. Accordingly, selection of content for storage in storage hardware 180 is simple in comparison to having to view a content guide to select content for recording.

A second content feed (such as a genre of content including sports events) can indicate availability of content targeted to sports fans, etc. For example, second content feed 210-2 can indicate availability of content option B1, content option B2, content option B3, content option B4, and so on.

Via display of graphical user interface 200 display screen 130, the user 108 can select from the multiple available content feeds 210 sorted according to genre to store content in storage hardware 180.

As a further example, assume that the user 108 utilizes a mouse to select data field 221 in graphical user interface 200. In response to selection of data field 221, the graphical user interface 200 can be configured to automatically populate checkmarks (shown as boxes) in data fields 231-1, 231-2, 231-3, 231-4, and so on. Thus, selection of data field 221 (and Kid's genre) can cause auto population of checkmarks in data field 231-1, 231-2, 231-3, 231-4, and so on. In such an instance, all available content in the corresponding genre is initially selected for recording in storage hardware 180. If desired, the user 108-1 can deselect certain data fields (via deleting a check mark) if they do not wish to store all available content in a particular selected genre.

Accordingly, via the selection of appropriate data fields in graphical user interface 200 displayed on the display screen 130, if a user desires to store sports video, the user can select a respective genre (selection of data field 222) including sports events; if a user desires to view political news video, the user can select a respective genre including political news; and so on. As mentioned, the respective subscriber customizes a respective content feed by selecting and deselecting data fields corresponding to different types of content across genres or within a given genre.

In this example, the user 108-1 has selected content options A1, A2, A3, and A4 in the Kid's genre; the user 108-1 has selected content options B1 and B4 in the Sports & News Genre; and so on.

Referring again to FIG. 1, and subsequent to subscriber selection of corresponding genres and or subgenres as previously discussed in FIG. 2, embodiments herein include producing settings information 170 from the user's selections. For example, server resource 165 (or other suitable resource) derives settings information 170 from the information provided by the subscriber via graphical user interface 200. Settings information 170 indicates the different selected genres or sub-genres of content (see FIG. 2) to be recorded and stored in storage hardware 180 on behalf of the respective subscriber.

Based on input such as an activation command from a subscriber or other suitable resource to store content on behalf of the subscriber as specified by the subscriber settings 170, monitor resource 175 retrieves the settings information 170. Subsequent to retrieval, the monitor resource 175 uses the subscriber settings information 170 to identify selected types of content in each of one or more different selected genres to be stored on behalf of the corresponding subscriber.

In one embodiment, the settings information 170 includes multiple content options (such as Atom channels) selected by the subscriber for a corresponding genre. For example, content option A1 in content feed 210-1 can represent a first channel from which content is available, content option A2 in content feed 210-1 can represent a second channel from which content is available, content A3 in content feed 210-1 can represent a third channel from which content is available, and so on.

Similarly, content option B1 can represent a first channel in content feed 210-2, content option B4 can represent a second channel in content feed 210-2, and so on.

As mentioned, the monitor resource 175 uses the settings information 170 as a basis to identify which content is to be retrieved and stored in a repository such as storage hardware 180.

As shown in FIG. 3, each of the different content options (such as channels) to be monitored by the monitor resource 175 can have an associated network address such as a URL (Uniform Resource Locator) as indicated by map information 375.

In this non-limiting example embodiment, the channel to monitor availability of content option A1 is assigned network address 310-1, the channel assigned to monitor availability of content option A2 is assigned network address 310-2, the channel assigned to monitor availability of content option A3 is assigned network address 310-3, and so on.

In one example embodiment, to identify content to record in storage hardware 180 on behalf of the subscriber, the monitor resource 175 communicates with server resources at appropriate network addresses 310-1, 310-2, 310-3, 310-4, 320-1, and 320-4 to determine content to be recorded in storage hardware 180 on behalf of a respective subscriber.

Figure 4:
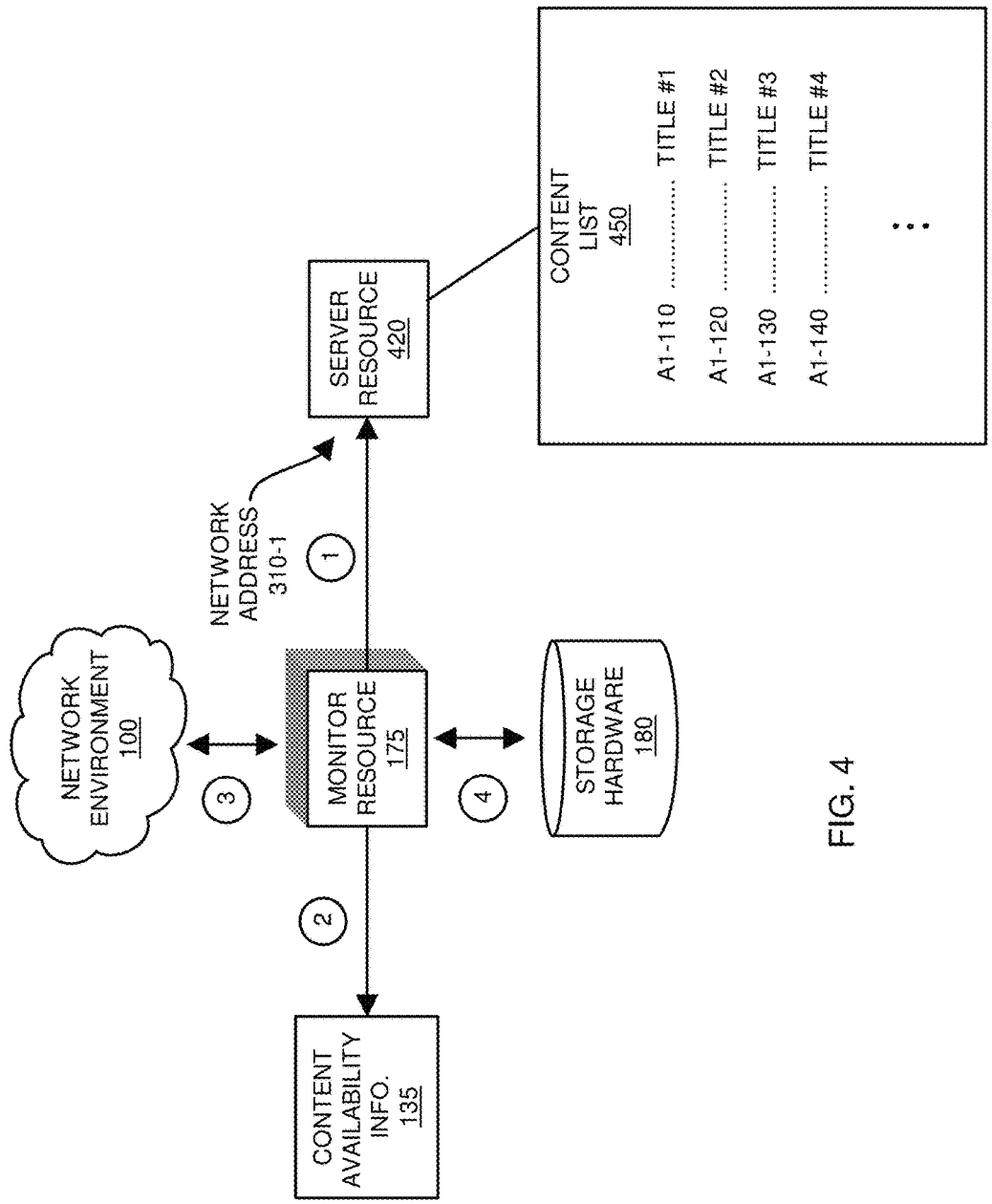
FIG. 4 is an example diagram illustrating use of a corresponding network address and communication with a server to identify newly available content according to embodiments herein.

FIG. 4 is an example diagram illustrating monitoring of one of multiple content options in a respective content feed to identify content to be recorded in storage hardware according to embodiments herein.

Recall that user 108-1 selected content feed 210-1 for storing content within a kid's genre. In this example embodiment, to check for availability of content associated with content option A1, the monitor resource 175 communicates with a corresponding server resource 420 (assigned network address 310-1) to retrieve a listing of available content associated with content option A1. In this example, in response to the inquiry from monitor resource 175, assume that server resource 420 transmits content list 450 to monitor resource 175. Content list 450 indicates current content available in network environment 100 for recording in storage hardware 180 on behalf of the user 108-1.

In such an instance, after retrieving the content list 450 (information indicating newly available content), the monitor resource 175 first checks storage hardware 180 to determine if corresponding content as specified by the listing 450 has already been recorded storage hardware 180. Assuming that content stored in storage hardware 180 can be shared amongst multiple subscribers, if content has already been recorded in storage hardware 180, there is no need to record the content in storage hardware 180 again. For example, content A1-110 (as specified by the list 450) may already be stored in storage hardware 180. In this case, the monitor resource 175 does not store another copy of content A1-110 (title #1) in storage hardware 180. In certain instances, however, note that it may be required to store a different copy of the same content for each of multiple different subscribers that request to store such content in storage hardware 180. In this latter instance, each subscriber is able to retrieve only their corresponding copy of stored content.

On the other hand, if content as indicated by the content list 450 has not already been recorded in storage hardware 180, the monitor resource 175 attempts retrieval and storage of the corresponding content in storage hardware 180 on behalf of the subscriber. For example, assume that content A1-120 is not currently stored in storage hardware 180. Assume that content A1-120 is transmitted over a broadcast content in network environment 100. To obtain the content A1-120 (title #2 of content), the monitor resource 175 can analyze content availability information 135 to determine a time slot and on what cable network channel the corresponding content A1-120 is available for recording. The monitor resource 175 tunes to the appropriate channel at the appropriate time and stores the corresponding content A1-120 in storage hardware 180.

Note that in certain instances, the content to be stored is available as over-the-top content. For example, assume that content A1-130 is available as over-the-top content. In such an instance, the monitor resource 175 communicates with an appropriate server resource in network environment 100 to retrieve the content A1-130 for storage in storage hardware 180.

Note that as a possible alternative to communicating with one or more corresponding server resources to identify newly available content, the monitor resource 175 can merely analyze content availability information 135 for the different types of content as specified in settings information 170. For example, the settings information 170 can indicate to record, on behalf of the subscriber, a particular television series that falls within a selected genre. In other words, content option A2 can represent a cartoon such as "Curious George." To store content as specified by content option A2 in the settings information 170, monitor resource 170 can access the content availability information 135 to identify which portion of content (such as the show "Curious George") is available to the subscriber domain over the shared communication link 191. The monitor resource 175 identifies corresponding timeslots and channels in which the content is broadcasted over shared communication link 191. In one non-limiting example embodiment, the monitor resource 175 tunes to an identified channel at the appropriate time to respective store content in storage hardware 180.

In one embodiment, monitor resource 175 receives a copy of the signals transmitted over shared communication link 191 to a corresponding service group. Thus, the monitor resource 175 can be coupled to shared communication link 191 to receive the same channels available to each of the subscriber domains in network environment 100. In such an instance, to record content as specified by the settings information 170, the monitor resource 175 tunes to one or more of the same channels available to the subscriber domain 150-1 to store content in storage hardware 180.

Subsequent to storage, the respective subscriber is able to access the stored content from the storage hardware 180. For example, the user 108-1 can operate communication device 110 to view a listing of content stored in storage hardware 180.

In one embodiment, as specified in FIG. 1, the user 108-1 initiates communications with server resource 185 to retrieve the listing for viewing on display screen 130. The listing can include titles of corresponding content stored in storage hardware 180.

In response to a selection of particular content (such as a particular title of content) in the listing from user 108-1, the server resource 185 initiates streaming of the selected title of content through distribution resource 125 over shared communication link 191 to subscriber domain 150-1. Access manager 160 receives and transmits the streaming content to communication device 110 for playback.

Via additional communications with server resource 185, the user 108-1 is able to manage recordings of content stored in storage hardware 180. As an example, the user 108-1 is able to delete content stored in storage hardware 180. As another example, the subscriber can prevent selected content stored in storage hardware from being deleted based on transmitting a save command to be applied to selected content stored in the storage hardware. In accordance with the save command, the content management resource 140 prevents deletion of the selected content.

When monitoring the network environment 100 for availability of content as indicated by the settings information 170, assume that the monitor resource 175 identifies that a first digital asset (such as first video content) and a second digital asset (such as second video content) available in the network are classified in a selected genre such as a Kid's genre including content directed to children. Recall that the user 108-1 selected content feed 210-1 to store content in storage hardware 180. In such an instance, because the user 108-1 selects the Kid's genre, the monitor resource 175 initiates storage of the first digital asset and the second digital asset in the storage hardware 180 for later retrieval by the user 108.

Note that the server resource 185 can be configured to curate content stored in storage hardware 180 for distribution over network environment 100 to a respective subscriber domain 150-1. For example, server resource 185 or other suitable resource can be configured to establish a respective communication channel on which to transmit stored content to subscriber domain 150-1. The server resource 185 can be configured to curate the first digital asset and the second digital asset (such as via back-to-back transmission) over the established channel (e.g., from server resource 185, through distribution resource 125, over shared communication link 191, to access manager 160 in subscriber domain 150-1). In one embodiment, the first digital asset and second digital asset are transmitted back-to-back as a contiguous video stream for subsequent playback on the communication device 110 operated by a subscriber. Thus, embodiments herein can include creating a custom playback stream of data for playback by a respective user via genre-based selection of content.

In a manner as discussed herein, the content management resource 140 (remotely located with respect to the subscriber domain 150-1) can be configured to identify multiple digital assets that fall within a selected genre as indicated by content feed 210-1 and/or customized content feed 210-2. The monitor resource 175 initiates storage of the identified content in storage hardware 180, which is disposed at a remote location with respect to a subscriber domain 150-1 in which the subscriber (user 108-1) resides. Note that according to alternative embodiments, any or all portions of the content management resource 140 can be located within subscriber domain 150-1.

As a more specific example, the subscriber domain 150-1 can include a respective monitor resource and/or a corresponding storage resource (i.e., local resources in subscriber domain 150-1) to identify selected types of content and store such content as specified by the settings information 170.

Limitation of Genre-Based Storage of Content According to Different Subscription Levels In a manner as previously discussed, the monitor resource 175 of content management resource 140 supports genre-based storage of content in storage hardware 180. In accordance with further non-limiting example embodiments, the monitor resource 175 can be configured to store content depending on different subscription levels.

For example, an introduction genre-based storage service (such as an introduction or "freemium" plan) can be offered to new subscribers for storage of a first level of content in storage hardware 180. In accordance with the first level (introduction level), the respective subscriber (user 108-1) is able to select up to a first number of content feeds (channels, subscriber-genres, etc.) within a respective genre. Each higher subscription level above the intro level (such as silver, gold, platinum, . . . ) can enable a corresponding subscriber to select up to corresponding higher number of channels in a respective genre for storage of content in storage hardware 180. The different levels of access can be fee based.

More specifically, according to an introduction subscription plan, assume that the corresponding subscriber is enabled to select up to two channels within each genre. In such an instance, the subscriber may select up to two content options such as data field 231-1 (for content A1) and data field 231-4 (for content A4).

A subscriber assigned a silver subscription level may be able to select up three data fields (three content options) within a respective genre for storage of content. In such an instance, such a silver subscriber may select the data field 231-1 (for content option A1), data field 231-2 (for content option A2), and data field 231-4 (for content option A4).

A subscriber assigned a gold subscription level may be able to select up to four data fields within a respective genre for storage of content. In such an instance, such a gold subscriber may select the data field 231-1 (for content A1), data field 231-2 (for content A2), data field 231-3 (for content A3), and data field 231-4 (for content A4). Accordingly, embodiments herein can include creating multiple levels of content feeds for a given class (or particular genre) depending on the subscription level assigned to a user.

In further non-limiting example embodiment, to provide different levels of storage capability within a respective genre to different levels of subscribers, the monitor resource 175 can be configured to access subscription level information 199 to identify a subscription level assigned to a respective subscriber when producing settings information 170. As mentioned, the subscription level assigned to user 108-1 (subscriber) can be one of multiple available subscription levels.

Assume that the user 108-1 selects a genre such as kids (content feed 210-1) for storage of content. When creating settings information 170, the server resource 165 uses the subscription level information 199 to map the subscription level of a user to channel capacity information. As mentioned, the channel capacity information can specify a number of channels that a user is able to select within a particular genre. In other words, the channel capacity information limits the subscriber to selection of a fewer-than-all portion of the group of channels (content options) available within a genre.

In accordance with subscription level information 199, server resource 165 restricts how many content options a subscriber can select when producing settings information 170. More specifically, as mentioned, the server resource 165 limits selection of content to record within a genre to fewer-than-all channels available in the genre as specified by the channel capacity information. For example, in accordance with embodiments as discussed above, the channel capacity information can indicate to limit a respective subscriber assigned to the introduction level to two channels per genre; the channel capacity information can indicate to limit a respective subscriber assigned to the silver level to three channels per genre; the channel capacity information can indicate to limit a respective subscriber assigned to the gold level to three channels per genre; and so on.

Subsequent to creation of settings information 170 in accordance with subscription level information 199 (indicating a number of content options that are selectable within a genre), the monitor resource 175 initiates storage of content in storage hardware 180 in a manner as previously discussed.

Storage of Content Based at Least in Part on Popularity

In accordance with yet further embodiments, embodiments herein can include tracking which titles of content in a selected genre as stored in the storage hardware 180 are consumed by the subscriber on communication device 110. For example, as previously discussed, the user 108-1 can initiate selection of kid's genre (content feed 210-1) for storage of content in storage hardware 180. Based on prior consumption of content stored in the storage hardware 180 for the selected genre (content feed 210-1), the monitor resource 175 can be configured to modify future retrieval and storage of content from the network 190-2 for the selected genre.

As a more specific example, the user 108-1 may initiate playback of first content stored in storage hardware 180. Assume that the first content (based on selection of a first content option in the Kid's genre) is stored in storage hardware 180 based on general of all content options in content feed 210-1 (Kid's genre). The storage hardware 180 may also store second content (from a second content option) in storage hardware 180 via content feed 210-1. However, the user 108-1 may seldom or never view the content received and stored in the storage hardware 180 based on the second content option. In such an instance, the monitor resource 175 can modify which future content is stored in the storage hardware 180. For example, because content as indicated by the second content option is seldom consumed by the user 108-1, the monitor resource 175 can discontinue monitoring the respective feed for new content and discontinue storage of such content from the second content option in storage hardware 180. Modification of settings information 170 may require the monitor resource to notification the user 108-1 and receive input from the user 108-1 that modification of the storage of content can be altered.

In accordance with yet further embodiments, the monitor resource 175 can be configured to identify a popularity of content consumption amongst a group of subscribers that consume different available content in the selected genre (such as kid's genre or content feed 210-1).

Based on the popularity of content consumption amongst the group of subscribers, the monitor resource 175 can be configured to initiate storage of the content in the storage hardware 180 for subsequent playback by the subscriber. For example, the content currently recorded in storage hardware 180 may not be the most popular content available in the respective genre in which the stored content falls. In such an instance, the monitor resource 175 can be configured to initiate storage of additional content, which is detected as being the most popular content for the selected genre in the storage hardware 180. Thus, a user may select unpopular content within a selected genre. Embodiments herein can include detecting that the initially selected content is not most popular content and storing such popular content in storage hardware 180 on behalf of the subscriber.

In accordance with yet further embodiments, as mentioned, a subscriber may select a particular genre for storage of content in storage hardware 180. Further embodiments herein can include producing a popularity ranking of different content stored in the storage hardware 180 for the selected genre. The popularity ranking can vary depending on consumption of the different content by the subscriber. For example, for the kid's genre, the monitor resource 175 can be configured to detect that the user 108-1 frequently retrieves and views only two of five different series of content recorded in storage hardware 180. In one embodiment, the monitor resource 175 utilizes the popularity ranking of content stored in storage hardware 180 and consumed by the subscriber as a basis to identify which available content in the network environment 100 is to be subsequently stored in the storage hardware 180. For example, the monitor resource 175 can be configured to continue retrieving and storing the two series while discontinuing recording of the other three series in storage hardware 180 after detecting a condition such as that the user never retrieves and plays back the other three series.

Figure 5:
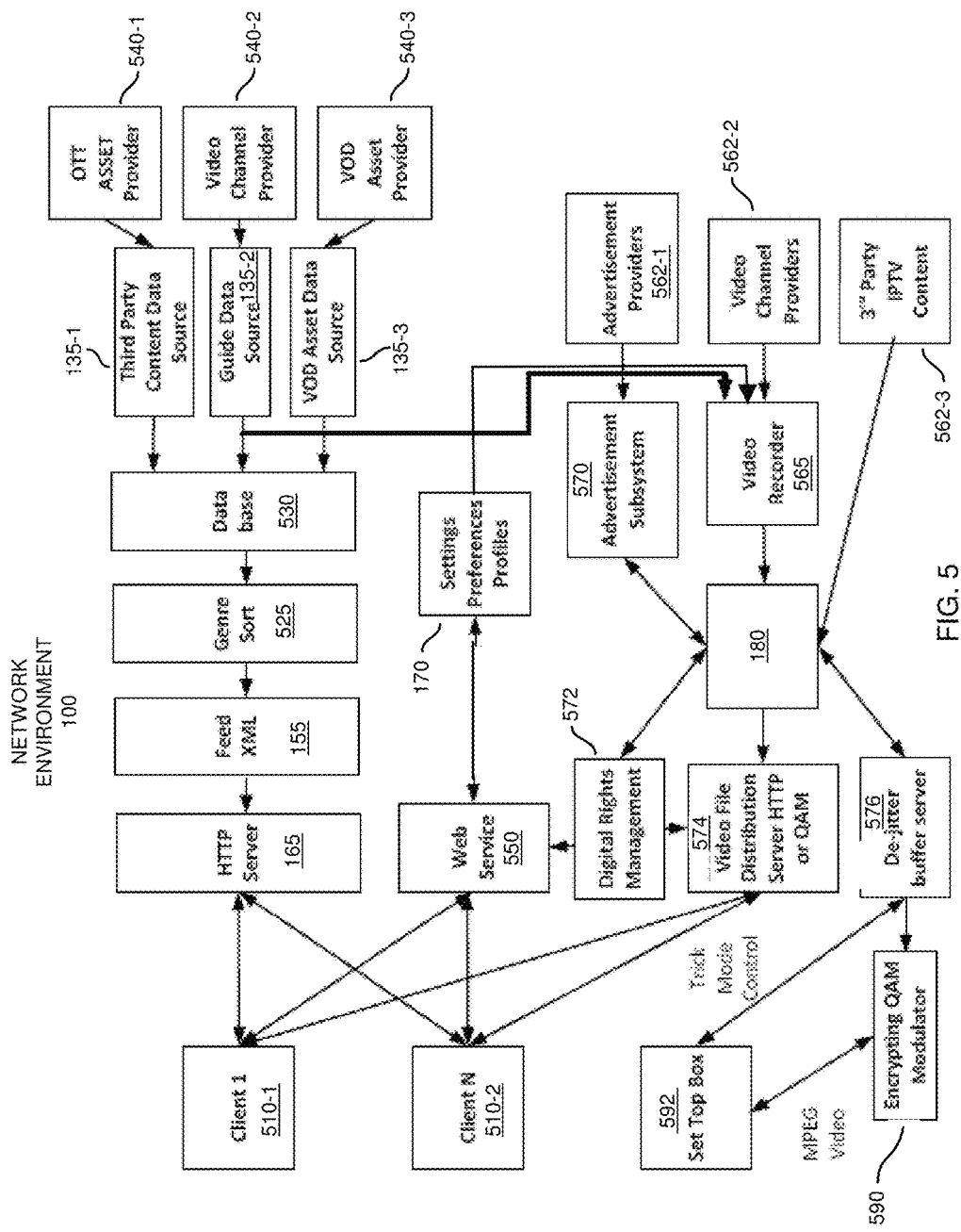
FIG. 5 is an example diagram illustrating a network environment supporting content management according to embodiments herein.

FIG. 5 is an example diagram illustrating management of content according to embodiments herein.

In this example embodiment, client devices 510 (e.g., client device 510-1, client device 510-2, . . . ) communicate with resources such as server resource 165 in network environment 100 in accordance with an appropriate communication protocol such as HyperText Transfer Protocol (HTTP). In a manner as previously discussed, the client devices 510 enable corresponding subscribers to retrieve and view a list of available genre-based content feeds.

Further in this example embodiment, content provider 540-1 produces and provides content availability information 135-1; content provider 540-2 produces and provides content availability information 135-2; content provider produces and provides content availability information 135-3; and so on. The content availability information 135 indicates the different types of content available from the different service providers 540 in environment 100.

If needed, the content availability information 135 received from the service providers 540 can be converted into a standard format prior to storage in repository 530.

In one example embodiment, sorter resource 525 periodically checks the content availability information 135 stored in repository 530 such as a database. As its name suggests, sorter resource 530 sorts the available content (i.e., digital assets) by genre.

As discussed herein, the sorter resource 525 can produce feed information 155 by retrieving listings of content (content availability information 135-1, 135-2, 135-3) provided by linear video content suppliers (ABC, Fox, etc), Over The Top (OTT) content providers 540 (e.g., content provider 540-1, content provider 540-2, content provider 540-3, . . . ). Content providers 540 can be any suitable resources such as RocketBoom (http://www.rocketboom.com/) and Video On Demand (VOD) providers such as HBO, Discovery, etc.

In one embodiment, the sorter resource 525 formats the results of sorting content into feed information 155. By way of non-limiting example, the feed information 155 can be or include a file including OPML referenced Atom feeds.

Subsequent to producing feed information 155, server resource 165 provides the subscribers operating client devices 510 access to the feed information 155. From the feed information 155, the subscribers in network environment 100 are able to select which available content is to be recorded on their behalf in storage hardware 180.

As previously discussed, FIG. 2 illustrates an example of different content feeds available for selection by subscribers. In one embodiment, the content feeds available for selection by client devices 510 can be formatted into a file such as an Online Processor Markup Language (OPML) file. Such a file can be broken down by genres of one or more Atom feeds. In other words, each genre of content can include one or more content options such as Atom channels (feeds) for monitoring availability of content from a corresponding content provider.

By way of a non-limiting example, in one embodiment, each of the Atom feeds (content options) can be configured in accordance with RFC 4287. As mentioned, each genre feed can include one or more channels pertinent to the corresponding genre.

Subsequent to displaying the rendition of feed information 155, the respective user selects the genres and/or individual components within genres in which they are interested. Upon finishing their selection, the user clicks on an appropriate web page button and submits the selection to a respective web service 550 in network environment 100. As mentioned, a user can select an entire genre of content or customize a selection to a portion of content options in a given genre.

In one embodiment, the web service 550 receives users selections and formats the selections into Atom feeds as settings information 170. The settings information 170 can be or include an OPML-based file. For each user, web service 550 stores settings information 170 indicating corresponding content to be recorded in repository 180 for later retrieval.

Selected $3^{rd}$ party over the top content 562-3 to be recorded can be retrieved from their original provider feeds (e.g., from servers) if the respective content is not currently stored in storage hardware 180. If a copy of the content is currently stored in storage hardware 180 for another subscriber, a pointer assigned to the subscriber can point to the company content, alleviating the need to store multiple copies of same content in storage hardware 180.

Video channel service content (NBC™, Fox™, etc.) to be recorded on behalf of a subscriber can be received by satellite or terrestrial IP feed and stored by video recorder 565. Content availability information 135-1 indicates when the different content is available.

If the agreements with the provider enable a single copy of content to be shared amongst multiple users, then a single copy can be stored and a reference to the location of the content is stored within storage hardware 180 on behalf of the subscriber. If shared rights are not available, then the content can be copied in its entirety to storage hardware 180 (such as a user's online storage locker).

Content stored in storage hardware 180 can be encrypted by a Digital Rights Management (DRM) system 572. The system 572 can use a cluster of GPU processors for accelerated AES-128 encryption. In such an instance, each user is issued an individual DRM decryption key, which is used to encrypt their content stored in storage hardware 180. The key is potentially stored in system 572.

Common content in storage hardware 180 can be encrypted using a key that is common across all users and is also stored within the system 572. There may be multiple keys and there may also be keys that are associated with specific content or content providers. Keys which are thought to be compromised can cause the DRM system to transcrypt the content from the original key in accordance with a new key. The new key can be stored in the place of the original key upon completion.

When the user desires to play back their content, the respective user contacts the web service 550 (potentially protected via OAuth 1.0) with a request for a list of the content stored within their allocated portion of storage hardware 180. The list of stored content can be returned as a list of XML or JSON (or other) encoded Uniform Resource Locators (URLS) with text describing each of the copies of stored content.

Subsequent to recording of selected content, the user may then select the content they wish to view on a respective playback device. The encryption key needed to decrypt corresponding stored content can be encrypted using a second encryption key. The primary key can be passed to the client in its encrypted form. Assuming that the client player has been previously provisioned with a set of keys that can decrypt the passed encrypted key when the user signs up with an account, the client player is then able to decrypt the content stored in storage hardware 180. Keys can be rotatable on a time basis and distributed in advance of the expiration of a previously issued key.

In one embodiment, the media player application executing on a respective client device pulls the content stored in storage hardware 180 from a video file distribution server (Content Delivery Network or other) as streaming content such as an HTTP Live Streaming (HLS), Smooth Streaming (SS) formatted set of files, etc.

As the content can be stored in the form of MPEG-4 and MPEG-2 (if the QAM option is selected), then the MPEG-4 content is sent from the storage hardware 180 through an on-the-fly packager that encapsulates the content in such a way as to meet the requirements of HLS or HSS. Both protocols support encapsulated MPEG-4.

Using an appropriate URL to retrieve content, the media player application executing on the client device buffers the content received from storage hardware 180. The media player application locally decrypts the received content.

To augment the amount of revenue received for storage services, embodiments herein can include advertisements subsystem 570. Advertisement subsystem 570 can be configured to receive advertisements (such as video) from advertisement providers 562-1. Control information can indicate positions in corresponding streamed video content in which to play back advertisements. Accordingly, the content streamed from storage hardware 180 to corresponding clients can be interleaved with advertisements.

In certain instances, video content stored in storage hardware 180 may already contain advertisements. Such advertisements may rapidly become stale. In accordance with one embodiment, the advertisement subsystem 570 can be configured to selectively or periodically replace the original advertisements with new advertisement information. Advertisement slots can be identified by an SCTE-35 or other suitable marker. Advertising content can be unencrypted or encrypted with a common key. Corresponding metadata in streaming content can indicate whether content is encrypted or not.

Note that the system as discussed herein may be extended for use with traditional QAM based Set-Top Boxes such as set-top box 592. In this case, a sufficient amount of QAM modulator bandwidth on a QAM within the same service group (cable trunk). A dejitter buffer server 576 pulls MPEG-2 encoded content from the storage hardware 180 and encodes the content using QAM modulator 590 in an isochronous manner. Trick mode commands (fast-forward, rewind, pause, play, etc.) can be sent directly to the Jitter Buffer Server 576 to control playback of corresponding content streamed from storage resource 180.

Figure 6:
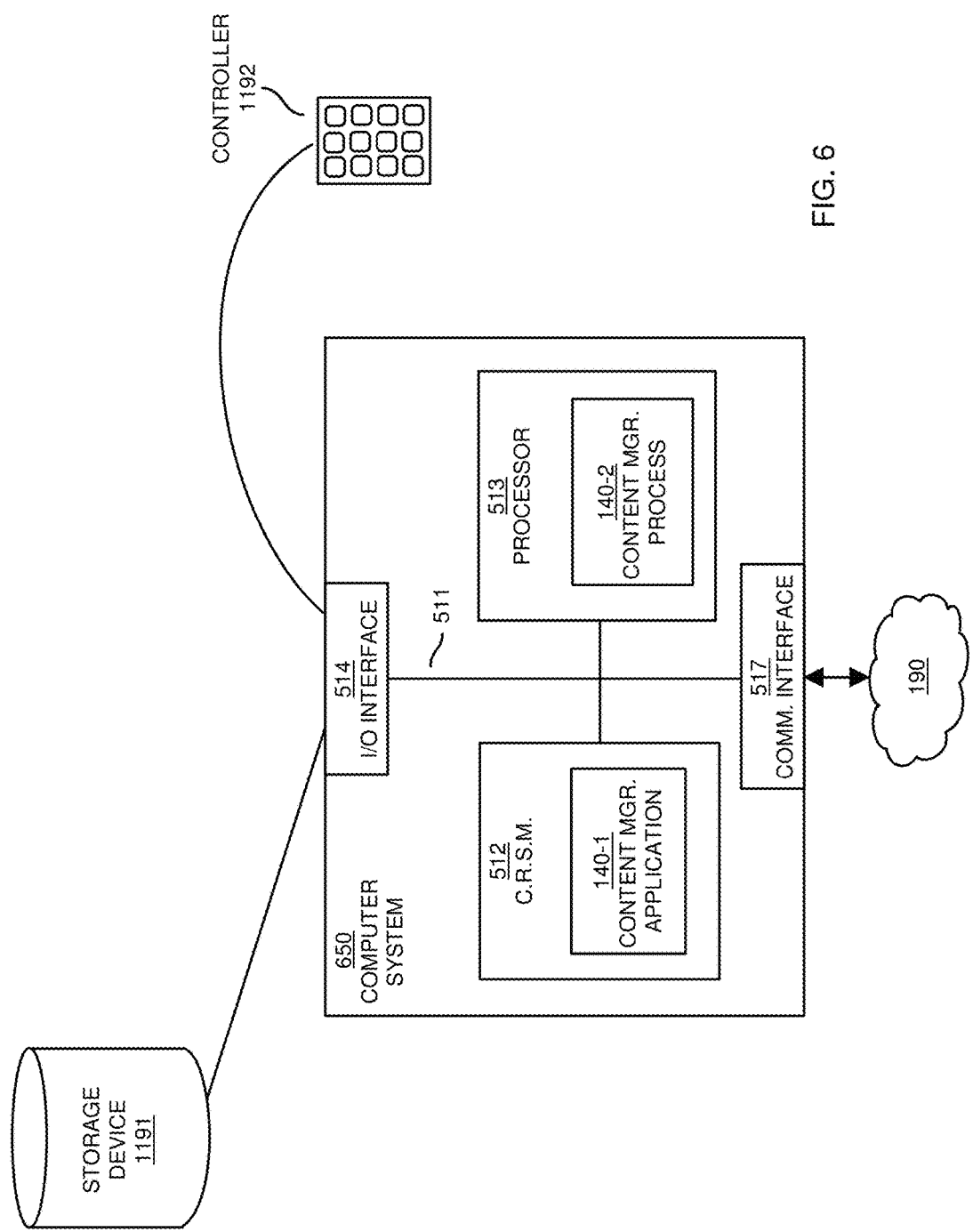
FIG. 6 is a diagram illustrating an example computer architecture in which to execute any of the functionality according to embodiments herein.

FIG. 6 is a diagram illustrating an example computer architecture in which to execute any of the functionality according to embodiments herein. Any of the different processing techniques can be implemented via execution of software code on a computer system.

For example, as shown, computer system 650 (e.g., computer processor hardware) of the present example can include an interconnect 511 that couples computer readable storage media 512 such as a non-transitory type of media (i.e., any type of hardware storage medium) in which digital information can be stored and retrieved. The computer system 650 can further include processor resource 513 (i.e., computer processor hardware such as one or more processor devices co-located or disparately located with respect to each other), I/O interface 514, communications interface 517, etc.

Computer processor hardware (i.e., processor 513) can be located in a single location or can be distributed amongst multiple locations in network environment 100.

As its name suggests, I/O interface 514 provides connectivity to external resources such as storage devices (such as storage device 1191), control devices (such as controller 1192), one or more display screens, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 enables the computer system 650 and processor resource 513 to communicate over a resource such as any of networks 190. I/O interface 514 enables processor resource 513 to access data from a local or remote location, control a respective display screen, receive input, etc.

As shown, computer readable storage media 512 can be encoded with content manager application 140-1 (e.g., software, firmware, etc.) executed by processor resource 513. Content manager application 140-1 can be configured to include instructions to implement any of the operations as discussed herein.

During operation of one embodiment, processor resource 513 accesses computer readable storage media 512 via the use of interconnect 511 in order to launch, run, execute, interpret or otherwise perform the instructions in content manager application 140-1 stored on computer readable storage medium 512.

Execution of the content manager application 140-1 produces processing functionality such as content manager process 140-2 in processor resource 513. In other words, the content manager process 140-2 associated with processor resource 513 represents one or more aspects of executing content manager application 140-1 within or upon the processor resource 513 in the computer system 650.

Those skilled in the art will understand that the computer system 650 can include other processes and/or software and hardware components, such as an operating system that controls allocation and use of hardware resources to execute content manager application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 650 may reside at any location or multiple locations in network environment 100. The computer system 650 can be included in any suitable resource in network environment 100 to implement functionality as discussed herein.

Note that each of the other functions as discussed herein can be executed in a respective computer system based on execution of corresponding instructions.

Figure 7:
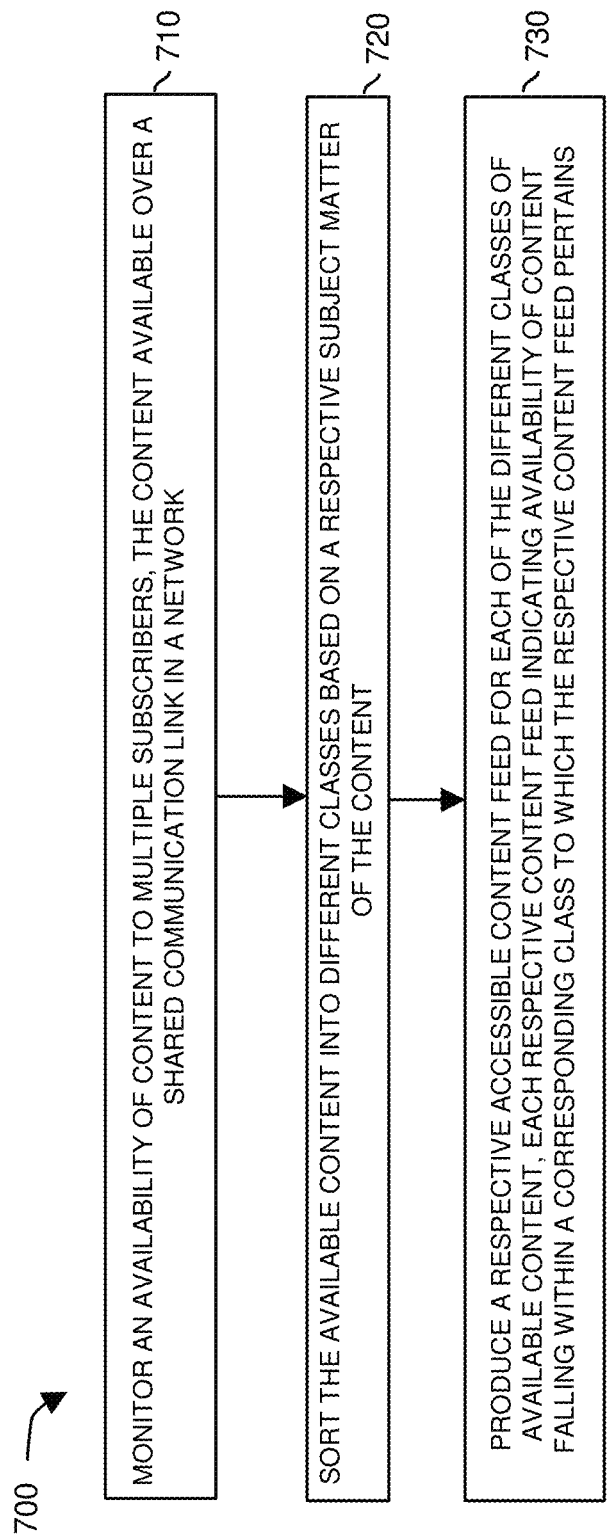
FIG. 7 is an example diagram illustrating a method of sorting content in different genres according to embodiments herein.

FIG. 7 is a flowchart 700 illustrating an example method according to embodiments. Note that there will be some overlap with respect to concepts as discussed above. The processing in the flowcharts below can be executed in any suitable order.

In processing block 710, the content management resource 140 monitors availability of content to multiple subscribers over a shared communication link 191 in a network environment 100.

In processing block 720, the content management resource 140 sorts the available content into different classes (such as genres) based on a respective subject matter of the available content.

In processing block 730, the content management resource 140 produces a respective accessible content feed 210 for each of the different classes of available content, each respective content feed 210 indicating availability of content falling within a corresponding class to which the respective content feed 210 pertains.

Figure 8:
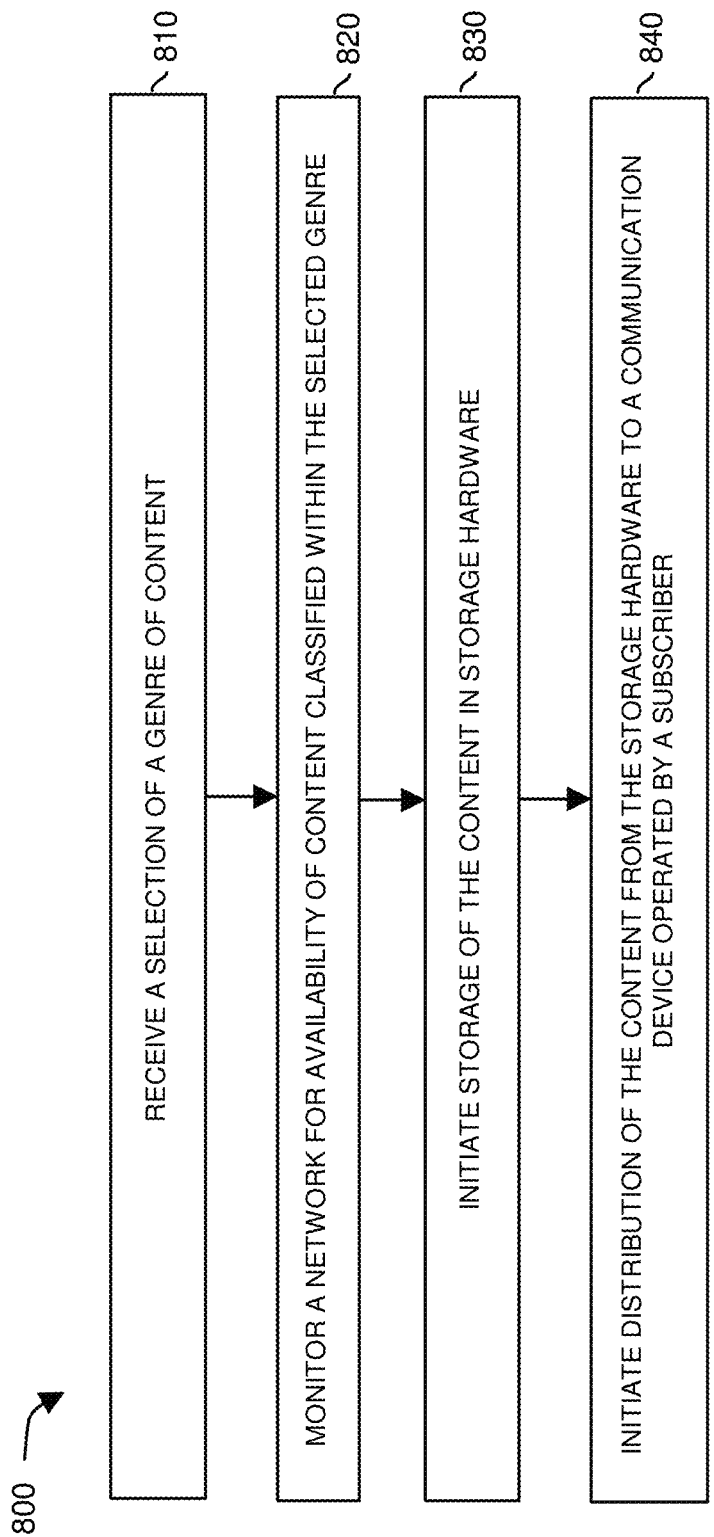
FIG. 8 is an example diagram illustrating a method of recording selected content on behalf of a subscriber according to embodiments herein.

FIG. 8 is a flowchart 800 illustrating an example method according to embodiments. Note that there will be some overlap with respect to concepts as discussed above. The processing in the flowcharts below can be executed in any suitable order.

In processing block 810, the content management resource 140 receives a selection of a genre of content from a resource such as a subscriber.

In processing block 820, the content management resource 140 monitors a network for availability of content classified within the selected genre.

In processing block 830, the content management resource 140 initiates storage of the content in storage hardware 180.

In processing block 840, the content management resource 140 initiates distribution of the content from the storage hardware 180 to a communication device 110 operated by a subscriber.

Figure 9:
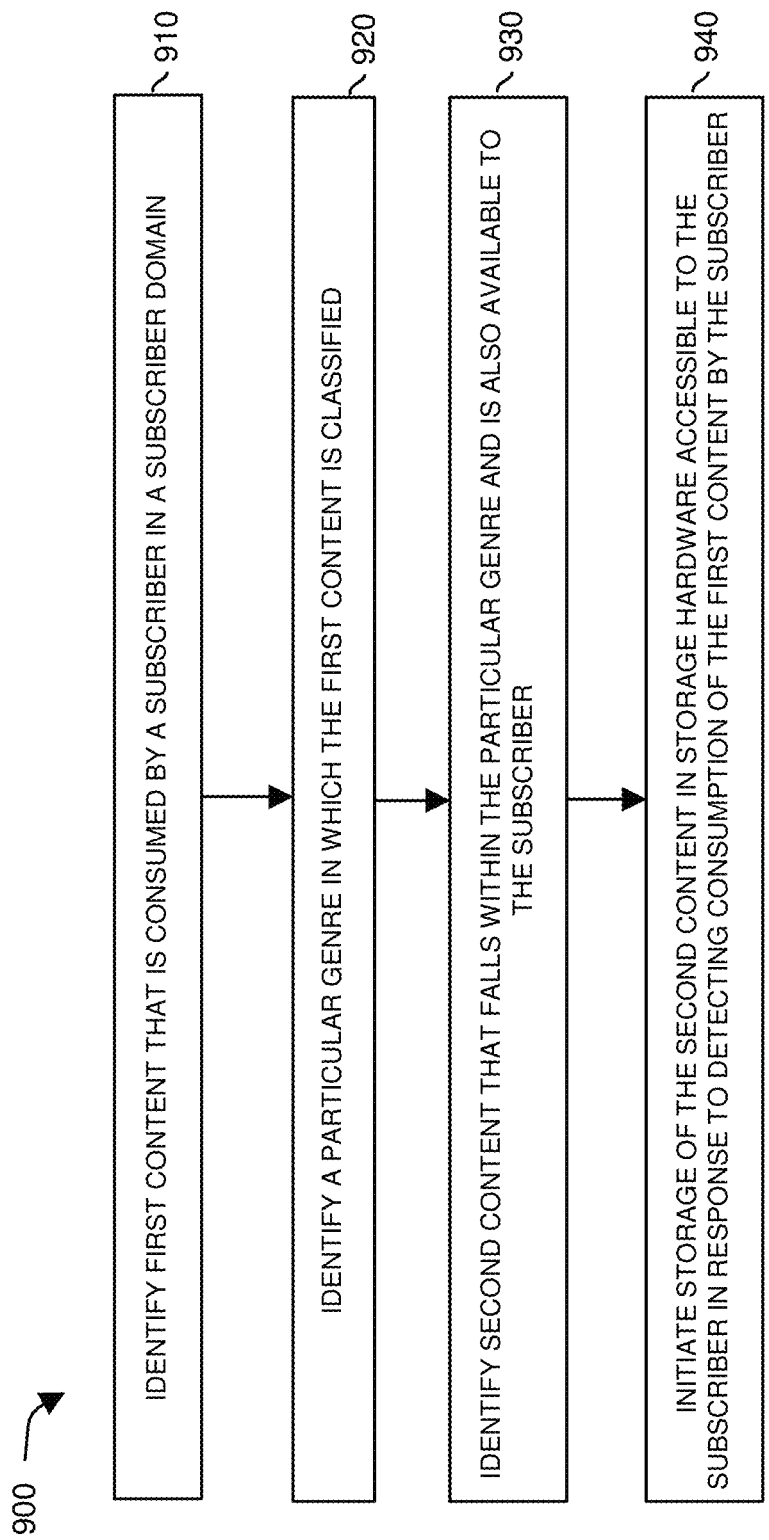
FIG. 9 is an example diagram illustrating a method of identifying content to record according to embodiments herein.

FIG. 9 is a flowchart 900 illustrating an example method according to embodiments. Note that there will be some overlap with respect to concepts as discussed above. The processing in the flowcharts below can be executed in any suitable order.

In processing block 910, the content management resource 140 identifies first content that is consumed by a subscriber in subscriber domain 150-1.

In processing block 920, the content management resource 140 identifies a particular genre in which the first content is classified.

In processing block 930, the content management resource 140 identifies second content that falls within the particular genre and is also available to the subscriber in subscriber domain 150-1.

In processing block 940, the content management resource 140 initiates storage of the second content in storage hardware 180 accessible to the subscriber in response to detecting consumption of the first content by the subscriber.

In accordance with further embodiments, note that monitor resource 175 can be configured to receive ranking information for content falling with in a genre selected for recording in storage hardware 180. In such an instance, the monitor resource 175 can analyze a ranking of different available content falling in the particular genre to be recorded in storage hardware 180. To limit an amount of data stored in storage hardware 180, the monitor resource 175 can be configured to select the second content for storage in the storage hardware 180 in response to detecting that the second content ranks as being sufficiently popular (based on being retrieved and played back) above a threshold value amongst other subscribers in a cable network environment. In this manner, the storage hardware 180 can store more popular content for later consumption by the user 108-1.

Note again that techniques herein are well suited for enabling a subscriber in a network environment to select content amongst different genres. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:
1. A method comprising:
  receiving a selection of a genre of content;
  monitoring a network for availability of content classified within the selected genre;
  retrieving the content classified within the selected genre;
  initiating storage of the retrieved content in storage hardware; and
  initiating distribution of the retrieved content from the storage hardware to a communication device operated by a subscriber,
  the method further comprising:
    receiving the selection of the genre of content from the subscriber, the subscriber residing in a respective subscriber domain of a cable network environment, the communication device in the subscriber domain having access to different genres of content over a shared communication link of the cable network environment into the respective subscriber domain, the shared communication link providing multiple subscriber domains in the cable network environment access to content; and
    wherein identifying the availability of content classified within the genre includes identifying which portion of content available to the subscriber domain over the shared communication link falls within the selected genre.

2. The method as in claim 1, wherein monitoring the network for availability of the content classified within the selected genre includes: identifying that a first digital asset and a second digital asset available in the network are classified in the selected genre, the selected genre specified by the subscriber; and
  wherein initiating storage of the retrieved content in storage hardware includes initiating storage of the first digital asset and the second digital asset in the storage hardware.

3. The method as in claim 2, wherein initiating distribution of the retrieved content includes:
  curating the first digital asset and the second digital asset into a video stream for subsequent playback on the communication device operated by the subscriber.

4. The method as in claim 1, wherein monitoring the network for availability of content classified within the selected genre includes: identifying multiple digital assets that fall within the selected genre; and
  wherein initiating storage of the retrieved content includes: storing the multiple digital assets in the storage hardware, the storage hardware disposed at a remote location with respect to the subscriber domain in which the subscriber resides.

5. The method as in claim 1, wherein retrieving the content classified within the selected genre includes: receiving the portion of content at a remote location with respect to the subscriber domain, the remote location having access to the different genres of content available to the subscriber domain over the shared communication link; and
  wherein initiating storage of the retrieved content in the storage hardware includes: initiating storage of the portion of content in the storage hardware, the storage hardware disposed at a disparate location with respect to the subscriber domain in which the subscriber resides.

6. The method as in claim 5 further comprising:
  providing the communication device access to the portion of content stored in the storage hardware via communications over the shared communication link of the cable network environment.

7. The method as in claim 1 further comprising:
  on a display screen of the communication device, initiating display of multiple genres of content for viewing by the subscriber; and from the subscriber, receiving the selection of the genre of content from the multiple genres of content.

8. The method as in claim 7 further comprising:
on the display screen, initiating display of multiple selectable feed options within the selected genre, each of the multiple selectable feed options specifying a particular type of content within the selected genre; and
from the subscriber, receiving selection of a particular feed option within the selected genre.

9. The method as in claim 8 further comprising:
monitoring a feed as specified by the particular feed option selected by the subscriber;
from the monitored feed, receiving notification of a particular digital asset available to the subscriber over the network;
identifying a channel on which to obtain the particular digital asset; and
initiating storage of the particular digital asset in the storage hardware for later retrieval by the subscriber.

10. The method as in claim 1 further comprising:
identifying a subscription level assigned to the subscriber, the subscription level being one of multiple available subscription levels, each of the multiple subscription levels providing a different level of access to content over the network; and
for the selected genre, selectively storing the content in the storage hardware in accordance with the subscription level assigned to the subscriber.

11. The method as in claim 1, wherein the retrieved content stored in the storage hardware includes multiple different titles of content, the method further comprising:
subsequent to storage of the content in the storage hardware for the selected genre, initiating display of a listing of the multiple different titles of content available for retrieval by the subscriber from the storage hardware;
from the subscriber, receiving selection of a particular title of content from the listing; and
initiating transmission of the particular title of content from the storage hardware over the shared communication link of the cable network environment to the subscriber.

12. The method as in claim 1, wherein monitoring the network for availability of content classified within the selected genre includes:
monitoring content guide information associated with each of multiple channels over which content is available to the subscriber over the shared communication link to the subscriber domain in which the subscriber resides.

13. The method as in claim 12, wherein the multiple channels includes a first channel and a second channel, the first channel being a broadcast channel accessible to the subscriber for viewing of broadcast content, the second channel being an over-the-top content channel available to the subscriber for retrieval of over-the-top content.

14. The method as in claim 1 further comprising:
tracking which titles of content in the selected genre as stored in the storage hardware are requested for retrieval by the subscriber for playback; and
modifying future retrieval and storage of content from the network for the selected genre based on prior consumption of content stored in the storage hardware for the selected genre.

15. The method as in claim 1 further comprising:
producing a popularity ranking of different content stored in the storage hardware for the selected genre, the popularity ranking depending on consumption of the different content by the subscriber; and
utilizing the popularity ranking as a basis to identify which available content in the network is to be subsequently stored in the storage hardware.

16. The method as in claim 1 further comprising:
identifying a popularity of content consumption amongst a group of subscribers that consume different available content in the selected genre; and
initiating storage of the content in the storage hardware for subsequent playback by the subscriber based on the popularity of content consumption amongst the group of subscribers.

17. The method as in claim 1 further comprising:
creating a sub-genre within the selected genre, the sub-genre created to classify future available content of a particular sub-topic within the selected genre.

18. The method as in claim 1 further comprising:
receiving a save command applied to selected content stored in the storage hardware; and
preventing deletion of the selected content.

19. The method as in claim 1, wherein the retrieved content stored in the storage hardware includes a first digital video asset and a second digital video asset retrieved over the shared communication link extending from the network to the subscriber domain of the cable network environment in which the subscriber resides, both the first digital video asset and the second digital video asset retrievable from the storage hardware for playback on the communication device.

20. The method as in claim 19, wherein retrieving the content classified within the selected genre further comprises:
receiving the first digital video asset from a first resource in the cable network environment; and
receiving the second digital video asset from a second resource in the cable network environment, the second resource disparately located with respect to the first resource.

21. The method as in claim 1, wherein receiving the selection of a genre of content includes: receiving a command to retrieve available titles of content falling within the selected genre from multiple available content delivery resources.

22. A method comprising:
receiving a selection of a genre of content;
monitoring a network for availability of content classified within the selected genre;
retrieving the content classified within the selected genre;
initiating storage of the retrieved content in storage hardware; and
initiating distribution of the retrieved content from the storage hardware to a communication device operated by a subscriber;
the method further comprising:
identifying a subscription level assigned to the subscriber;
mapping the subscription level to channel capacity information, the channel capacity information specifying a number of channels;
identifying a group of channels having content available from and falling within the selected genre;
limiting selection to a fewer-than-all portion of the group of channels from which to retrieve the content available from the selected genre, the fewer-than-all portion of channels being the number of channels as specified by the channel capacity information; and
storing content received on the fewer-than-all channels in the storage hardware.

* * * * *